United States Patent [19]
Cotter

[11] Patent Number: 4,560,246
[45] Date of Patent: Dec. 24, 1985

[54] OPTICAL TRANSMISSION
[75] Inventor: David Cotter, Woodbridge, England
[73] Assignee: British Telecommunications, London, England
[21] Appl. No.: 500,436
[22] Filed: Jun. 2, 1983
[30] Foreign Application Priority Data Jun. 4, 1982 [GB] United Kingdom ............... 8216307

[51] Int. Cl.⁴ ............................................. G02B 5/14
[52] U.S. Cl. .................................. 350/96.16; 350/320
[58] Field of Search ................... 350/96.15, 96.16, 320

[56] References Cited
U.S. PATENT DOCUMENTS
4,261,640  4/1981  Stankos et al. ............... 350/96.15 X

OTHER PUBLICATIONS
Optical Fiber Telecommunications, 1979, Academic Press, Chapter 5, New York (US), S. E. Miller et al.: "Non Linear Properties of Optical Fibers" pp. 125 to 150.
The Radio and Electronic Engineers, vol. 51, Nos. 7/8, Jul.-Aug. 1981, London (GB), P. A. Kirby: "Semiconductor Laser Sources for Optical Communication" pp. 362 to 376.
"Transmission of Narrow Band High Power Laser Radiation Through Optical Fibers" by P. Labudde, P. Anliker and H. P. Weber, Optics Communication, vol. 32, No. 3, Mar. 1980, pp. 385-390.
"Optical Power Handling Capacity of Low Loss Optical Fibers as Determined by Stimulated Raman and Brillouin Scattering" by R. G. Smith; Appln. Opt., 1972, II, pp. 2489-2494.
"Maximum Single Frequency Input Power in a Long Optical Fiber Determined by Stimulated Brillouin Scattering" by N. Uesugi et al., Electronics Letters, May 28, 1981, vol. 17, No. 11.
"Stimulated Brillouin Scattering in Optical Fibers" by E. P. Ippen and R. H. Stolen, Appln. Phys. Letter, vol. 21, No. 11, Dec. 1, 1972.
"Devices and Materials Fro 4 μm Band Fiber-Optical Communication", Solid State and Electron Devices, vol. 2, No. 5, Sep. 1978, pp. 129-137, by G. H. L. Goodman.
"Stimulated Rayleigh, Brillouin and Raman Spectroscopy", Ch E2 in Laser Handbook, vol. 2, F. I. Arrecchi and E. O. Schulz-Dubois (Eds), North Holland, Amsterdam 1972, pp. 1077-1150 by W. Kaiser and M. Maier.
"Polarization Effects in Fiber Raman and Brillouin Lasers", IEEE Jnl. of Quantum Electronics, vol. QE-15, No. 10, Oct. 1979, pp. 1157-1160 by R. H. Stolen.
"Handbook of Lasers with Selected Data on Optical Technology"; Chemical Rubber Co., 1971, (Esp. pp. 481, 486, 487) by R. J. Pressley (Ed).
"Rayleigh and Brillouin Scattering in $K_2O$-$SiO_2$ Glasses", Jnl. Amer. Ceram. Soc., vol. 56, No. 10, Oct. 1973, pp. 510-514 by Schroeder et al.
"Brillouin Scattering Measurements on Optical Glasses:" Phys. Rev. B, vol. 19, No. 12, Jun. 1979, pp. 6583-6591 by D. Heiman et al.
"Theory of Stokes Pulse Shapes in Transient Stimulated Raman Scattering", Phys. Rev. A, vol. 12, No. 1, Jul. 1970, pp. 60-72.
"Transient Effects in Stimulated Light Scattering", Optical & Quantum Electronics, 7 (1975), pp. 263-279 by K. Daree.
"Photoelastic Properties of Crystals", Ch. 5 Acousto-Optics, Wiley 1979, pp. 44-48 by J. Saprial.
"Receiver Performance Evaluation of Various Digital Optical Modulation-Demodulation Systems in the 0.5-10 μm Wavelength Region" by Y. Yamamoto, IEEE Jnl. of Quantum Electronics, vol. OE-16, No. 11, Nov. 1980, pp. 1251-1259.
"Stimulated Brillouin Scattering in Monomode Optical Fiber", Jnl. Optical. Comms., vol. 14 (1981), 1, pp. 10-19 by D. Cotter.

Primary Examiner—William L. Sikes
Assistant Examiner—Akm E. Ullah
Attorney, Agent, or Firm—Cushman, Darby & Cushman

[57] ABSTRACT

Stimulated Brillouin Scattering, which occurs when light of narrow linewidth and above a threshold power is launched into a low loss optical fiber, is suppressed by time-varying the phase angle of the transmitted light waves.

37 Claims, 8 Drawing Figures (EXAMPLE 1)

(EXAMPLE 2,3)

(EXAMPLE 4)

OPTICAL TRANSMISSION

FIELD OF THE INVENTION

This invention relates to optical transmission, and in particular to methods of, and apparatus for, optical transmission along dielectric waveguides, and to optical communication systems employing optical transmission.

BACKGROUND OF THE INVENTION

Optical transmission employs electromagnetic waves from a spectrum of wavelengths including but extending well beyond visible light, and expressions herein such as "optical", "light" and related terms are accordingly to be understood in the wider sense of referring to electromagnetic waves within this broader spectrum of wavelengths.

In optical communication systems light, modulated in accordance with information to be conveyed, is transmitted along dielectric waveguides.

The majority of optical communication systems presently in operation, of which optical telecommunication systems are an important example, employ a combination of transmission of non-coherent light and direct intensity modulation for conveying digital information.

Considerable advantages in respect of, among others, bandwidth utilization, transmission bandwidths, choice of appropriate modulation techniques, and receiver sensitivity, are envisaged to derive from using coherent light for transmission. Unlike optical communication systems using non-coherent light for transmission, systems using coherent light (referred to hereinafter also as "coherent systems") have to employ narrow line width light sources and, particularly for long distance communication, will generally use low loss, single mode optical fibres as the dielectric optical waveguides.

It has been appreciated for some time now that if narrow line width light, for example from a laser light source, is launched into an optical fibre, and especially into a low loss optical fibre, then there is a threshold power (the natural Stimulated Brillouin Scattering threshold for the fibre at that linewidth) above which Stimulated Brillouin Scattering (hereinafter also referred to as SBS) occurs in the fibre (see for example, R. G. Smith, "Optical Power Handling Capacity of Low Loss Optical Fibres as Determined by Stimulated Raman and Brillouin Scattering", Appl Opt, 1972, II, pp 2489–2494; E. P. Ippen and R. H. Stolen "Stimulated Brillouin Scattering in Optical Fibres", Appl Phys Lett, Vol 21, No 11, Dec. 1, 1972; "Optical Fibre Telecommunications", 1979, Academic Press, New York (US), ed S. E. Miller et al, Chapter 5 "Non Linear Properties of Optical Fibres", pp 125–150, para 5.3; P. Labudde et al, "Transmission of Narrow Band High Power Laser Radiation Through Optical Fibres", Optics Communications, Vol 32, No 3, March 1980, pp 385–390; N. Uesugi et et al, "Maximum Single Frequency Input Power in a Long Optical Fibre Determined by Stimulated Brillouin Scattering", Electronics Letters, May 28, 1981, Vol 17, No 11).

As explained in these references, Stimulated Brillouin Scattering is a stimulated scattering process which converts a forward travelling optical wave into a backward travelling optical wave which is also shifted in frequency. At launched light powers exceeding the above mentioned threshold power, the amount of scattering rises steeply until the power transmitted forward through the fibre becomes nearly independent of the launched power. In addition to thus attenuating the transmitted power, SBS has further detrimental effects such as causing multiple frequency shifts, increased backward coupling into the laser light source and, for sufficiently high launched powers, even permanent physical damage to the fibre.

It should be noted that, although of great importance for coherent systems for which the use of narrow line width sources is mandatory, SBS is of course not confined to coherent systems. Rather, SBS may occur whenever the appropriate conditions are satisfied in respect of line width, launch power, characteristics of the optical waveguide, and so forth.

SBS is only one of several non-linear processes which may occur in optical waveguides, and is generally less significant with broad line width than with narrow line width light. Nevertheless, in view of its threshold being usually lower than thresholds for other non-linear processes, SBS has been considered to present a major limitation for optical communication systems (see the cited references, and in particlar R. G. Smith, P. Labudde, and N. Uesugi). This limitation, which manifests itself by constraints on the maximum practicable launch power, has special significance for coherent systems where, as has been indicated before, there is no option of using broad line width light. A constraint on the launch power has of course a direct effect on the maximum transmission length which can be achieved without recourse to repeaters or regenerators.

The majority of the cited references discusses the aforesaid constraint on the launch power to levels not much greater, and preferably less than the SBS threshold, but in none of the references is it suggested whether and, if so, how this limitation may be overcome. Thus, for example, N. Uesugi et al, (cited above) demonstrate that in the near infrared region SBS will occur in long single mode silica fibres with input powers as low as a few milliwatts. Yet, in spite of their investigations having been carried out in view of the importance of SBS for coherent communication systems, the authors fail to suggest even the existence of a suitable remedy.

SUMMARY OF THE INVENTION

It is an object of the present invention to provide transmission of light along dielectric waveguides by methods which avoid at least some of the detrimental effects of Stimulated Brillouin Scattering.

It is another object of the present invention to provide methods of transmitting light along dielectric optical waveguides, which result in substantial suppression of Stimulated Brillouin Scattering.

It is yet another object of the present invention to provide an optical transmission system using dielectric optical waveguides and provided with means for substantial suppression of Stimulated Brillouin Scattering.

According to one aspect of the present invention, a method of transmitting light along a dielectric optical waveguide comprises lauching into the optical waveguide a high power optical wave originating from one or more narrow linewidth light sources, said optical wave having a phase angle which varies with time (e.g. imposed recurrent phase deviations) in such a manner that Stimulated Brillouin Scattering is substantially suppressed.

According to another aspect of the present invention, an optical transmission system comprises one or more narrow line width light sources, and an optical waveguide, said source or sources being adapted to launch into the optical waveguide a high power optical wave the phase angle of which varies with time (e.g. imposed recurrent phase deviations) in such a manner that Stimulated Brillouin Scattering is substantially suppressed.

The terms "high power" and "narrow line width" herein are to be understood to mean sufficiently high and sufficiently narrow for SBS to be significant for a corresponding optical wave of non-varying phase angle e.g. in the absence of suitable imposed recurrent phase deviations), the significance of SBS for said correspoding optical wave being readily determined by trial and error experiment.

Some guidance in performing the experiment may be gained from the observation that, for a given optical waveguide and wavelength, a narrowing of the line width is generally accompanied by a reduction in the power at which SBS becomes significant. To this may be added that power at which SBS becomes significant is dependent also upon the characteristics of the dielectric optical waveguide and the wavelength of operation. Thus, long low loss fibres are, generally, more prone to SBS, and the SBS threshold tends to decrease with increasing wavelengths.

The time variation of phase angle required for substantial suppression of Stimulated Brillouin Scattering is also readily determined by trial and error experiment. The manner in which such experiments can be designed with become apparent directly from and also by analogy with the more specific discussion hereinafter.

Some guidance in performing the experiments may be gained from a theoretical model discussed hereinafter.

Conveniently the optical waveguide is a single mode fibre having one or more transmission loss minima with respect to wavelength, and said one or more narrow line width light sources are arranged to operate at wavelengths at or near the or one of the transmission loss minimum.

Preferably the or each light source is a laser light source arranged to operate at a wavelength longer than 1 μm.

The invention is conveniently performed, for example, by a combination of one or more narrow line width laser light sources, operating in the near infrared region between 1.2 μm and 1.7 μm with a full width half maximum (FWHM) line width of less than 1 MHz, and a monomode silica optical fibre.

Silica optical fibres often have absorptive loss minima of 0.5 dB/km or less at 1.3 μm, 1.5 μm, or at both these wavelengths. A high power optical wave in accordance with the present invention of 10 mW or more is advantageously launched into the fibre. Continuous fibre lengths greater than 10 km may usefully be employed.

For operation at longer wavelengths with fibres having low absorption loss at such wavelengths (compare Goodman, Sol. State and Electronic Device 1978, 2, 129-137), feasible unrepeated lengths would be generally greater and the SBS threshold for continuous wave radiation and the minimum powers advantageously employed in accordance with the present invention would be generally smaller. Such fibres may, for example, be fluoride glass fibres and the like presently envisaged to operate at wavelengths of 3 μm or above.

The present invention also provides a method of transmitting information which comprises launching into an optical fibre a high-power optical carrier wave originating from one or more narrow-linewidth sources and modulated in correspondence with the information to be transmitted, the phase angle of the modulated wave varying with time in such matter that Stimulated Brillouin Scattering is substantially suppressed.

The present invention further provides a transmission system comprising one or more narrow-linewidth light sources, modulating means and an optical fibre, said source or sources and means being adapted to launch into the fibre a high-power information-modulated optical carrier wave the phase angle of which varies with time in such manner that Stimulated Brillouin Scattering is substantially suppressed.

For the avoidance of any possible doubt, it is here stated that the varying of the phase angle referred to may be, but need not necessarily be, a direct consequence solely of the modulation in correspondence with the information.

For the further avoidance of possible doubt, it is here stated that throughout this specification the term "modulation" is to be understood, as is conventional, to include within its scope the term "keying", this latter being a special case of modulation widely used for transmission of digital information.

Advantageously, demodulaton of such carrier waves is performed coherently.

The present invention may be advantageously applied to the transmission of digital information at high bit rates with binary phase shiftkeying of the optical carrier wave. In this case, the substantial suppression of SBS can be achieved by using a keyed phase shift of $(2n+1)\pi$ where n is 0 or an integer, or of a keyed phase shift sufficiently close to such odd multiples of $\pi$ to achieve substantial suppression of SBS.

The present invention may also advantageously be applied to the transmission of digital information, conveniently in binary form, at high bit rates with frequency shift keying. In this case, the substantial suppression of SBS can be achieved by using a sufficiently large keyed frequency shift.

The two cases of phase shift keying and frequency shift keying just referred to conveniently illustrate the use of trial and error experiments, as follows. These experiments can take the form of determining, for a given bit rate, launched light power, line-width, and fibre whether any trial keyed phase shift is close enough to $(2n+1)\pi$ to substantially suppress SBS, or whether any trial frequency shift is large enough. In trial experiments, SBS may be monitored either by means of the reflected wave or by means of the fibre output power.

The present invention is especially advantageous for these two cases where the bit rates are in excess of 100 MBit s$^{-1}$, more especially of the order of 1 GBit s$^{-1}$. It is not applicable in practical terms for very low bit rates, as can be appreciated by consideration of the low-bit-rate limit, that is to say phase or frequency shift keying at a bit rate of 1 Bit s$^{-1}$ would not affect such a short time-scale process as SBS.

When, as in the foregoing two cases, the modulation technique itself is based on imposing variations on the phase of the carrier wave, the information modulation may be used for the substantial suppression of SBS. However this does not, of course, preclude the possibility of using additional information modulations or taking additional measures assisting according to the invention in the suppression of SBS.

If, however, it is desired to use amplitude modulation (for example shift keying) in correspondence with the information to be transmitted, then the information modulation generally has a small effect on SBS. Thus, for example, in an amplitude-shift-keyed system the SBS threshold in terms of the average "light on" power will be typically only a factor or two higher than for a continuous-wave source. A similar problem arises if for any reason it is desired to use a phase or frequency modulation which is itself not able to suppress the SBS, or if one wishes to secure the system against the possibly damaging effects of the cessation of an SBS-suppressing information modulation.

Accordingly, the present invention may be applied by the use of a periodically-driven optical phase modulator, for example between a laser light source and the optical fibre to provide modulation additional to the information modulation thereby to obtain the required substantial suppression of SBS. Various forms of modulation may be used, for example, square wave and sinusoidal.

SBS may also be suppressed by the use as the carrier wave of the resultant of the addition of component waves of different frequencies.

In circumstances where a periodically driven phase modulator or a carrier wave as just specified are employed, useful preliminary trial and error experiments may be performed without the application of an information modulation. These experiments would be directed to the determination, for a given launched light power, line-width and fibre, of the phase modulation parameters or frequency difference necessary to suppress the SBS. Once more, a theoretical model may possibly be used to guide these experiments.

A carrier wave which is the resultant of the addition of component waves of differing frequencies can conveniently be generated in a single source, e.g. by arranging for a single laser to operate on two longitudinal modes of slightly different wavelengths, with a resultant mode beating effect. Alternatively, two single-frequency lasers may be used.

The information modulation of the carrier wave may be effected either after the addition of the component waves of differing frequencies or else by modulation of the individual component waves before or at the same time as their addition. This last approach is especially convenient where the component waves originate in a single soure so that they can be modulated together by control of the source, e.g. in accordance with an amplitude shift keying scheme.

Detection of a modulated carrier where the carrier is the resultant of the addition of two component waves of different frequencies may be performed on just one of these frequencies with a detector whose coherent detection bandwidth is less than the beat frequency. Only half of the transmitted optical power is then utilised for data transmission and there is therefore a 3 dB power penalty. However, compared with previously proposed coherent amplitude shift keyed systems, an amplitude shift keying system operated in this way will have the potential of greater repeater spacings because higher launch powers are permissible on account of the suppression of SBS.

Another way of using a wave which has been modulated with a periodically-driven phase modulator or which is the resultant of the addition of component waves of different frequencies is as optical phase reference to be used in the demodulation of a separate wave which has phase or frequency information modulation. Thus in some phase or frequency shift keyed systems it may be necessary to transmit simultaneously a continuous wave carrier component in order to provide an optical phase reference, and the present invention finds application insofar as the carrier component could give rise to SBS in some circumstances.

A wave modulated with a periodically-driven phase modulator or which is the resultant in the addition of component waves of different frequencies may, of course, be used for continuous wave transmission generally and not only in telecommunications.

BRIEF DESCRIPTION OF THE DRAWINGS

The present invention will now be described further by way of examples and with reference to the accompanying drawings of which.

DETAILED DESCRIPTION

Figure 1:
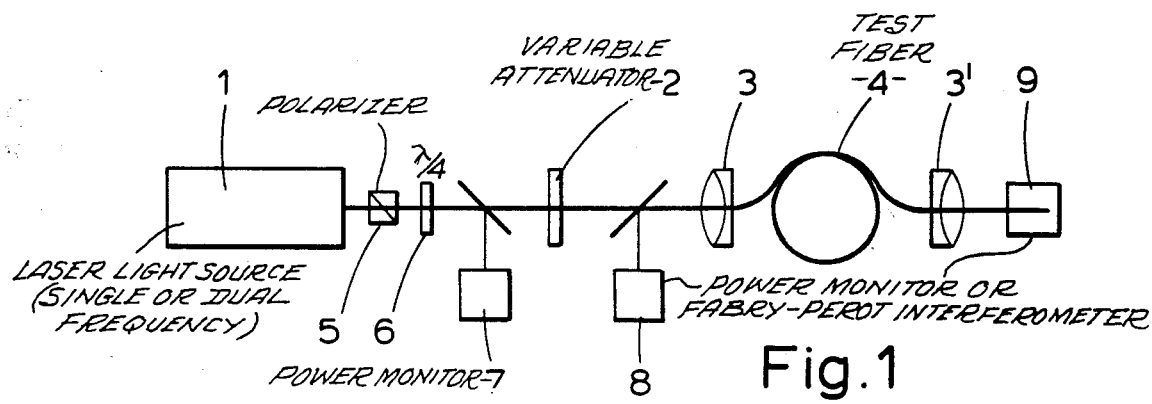
FIG. 1 is a schematic diagram of apparatus for performing the present invention.

Referring now to FIG. 1, an experimental arrangement to observe SBS comprises a laser light source 1, a test fibre 4, and power or frequency monitoring devices 7, 8, 9. A variable attenuator 2 serves to attenuate the light entering the fibre 4 from the laser 1, and a polarizing filter 5 and a quater wave plate 6 are interposed between the laser 1 and the optical fibre 4, which has focussing microlenses 3 and 3' disposed at each end.

The devices 8 and 9 are either powermonitors, such as calibrated Ge photodiodes, or Fabry-Perot interferometers to monitor the frequency syepctrum of the light passing through the test fibre 4, depending on the measurement to be performed.

Referring now also to FIGS. 2 to 5, the following laboratory experiments were performed to demonstrate SBS and its suppression.

EXPERIMENT 1

A continuous-wave single-frequency $Nd^{3+}$: YAG (yttrium aluminium garnet) laser operating on the 1.319 $\mu$m transition was used. This laser produced an output power of around 100 mW in a single longitudinal mode and diffraction-limited $TEM_{oo}$ transverse mode. The laser linewidth was measured using a scanning confocal Fabry-Perot interferometer of 300 MHz free spectral range, and found to be less than 1.6 MHz which is the instrumental resolution. This is more than an order of ten narrower than the spontaneous Brillouin linewidth $\Delta \nu_B$.

FIG. 1 shows the experimental arrangement used to observe SBS in low-loss silica fibre.

The output of the laser 1 was attenuated using a circular variable density filter 2 and focussed into the test fibre 4 using a microscope objective 3. The optical power emitted from both the near and distant ends of the fibre may be monitored using calibrated Ge photodiodes. A scanning confocal Fabry-Perot interferometer of 7.5 GHz free spectral range was used to record the frequency spectrum of the emitted light. At the conclusion of experiments on a fibre, the fibre may be cut back to within a few meters of the launch objective to measure the power propagating in the guided mode.

The linear polariser 5 and quarter-wave plate 6 were intended to provide optical isolation between the laser and fibre. However, under conditions of strong SBS this arrangement proved ineffective in isolating the laser from the backscattered signal, due to polarisation scrambling in the fibre. Nevertheless the laser 1 continued to operate in a stable single longitudinal mode under all conditions probably because the frequency of the backscattered light was shifted sufficiently from the peak of the Nd:YAG gain curve.

Figure 2:
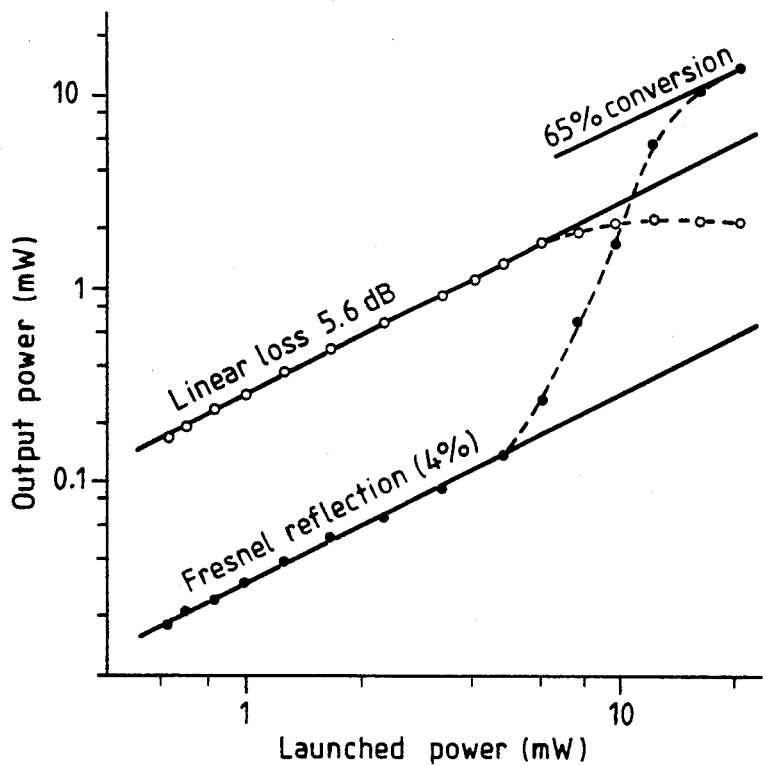
FIGS. 2, 4 and 5 are graphs representing the relationship between input powers and output powers of optical transmission systems.

Experiments were performed with a 13.6 km length of $GeO_2$-doped mono mode silica fibre having a core diameter of 9 μm, corecladding index difference of 0.3%, cut-off wavelength of 1.21 μm, and loss at 1.32 μm of 0.41 dB/km. Using the measured refractive index profile a computer solution of the guided mode distribution gives $A = 4.7 \times 10^{-11} m^2$ at 1.31 μm. FIG. 2 shows the output power from each end of the fibre as a function of the launched power. At low input power the output power monitored in the backward direction was due only to the Fresnel reflection from the cleaved end face of the fibre. However at input powers exceeding 5 mW the output power in the backward direction was seen to increase rapidly in a nonlinear fashion, and the efficiency of conversion to the backscattered wave reached 65%. At low input powers the power emitted from the distant end of the fibre was related linearly to the input power, determined by the linear loss of 5.6 dB. However at input powers exceeding 6 mW the output power became nonlinear. At input powers greater than 10 mW the output power in the forward direction reached a saturated maximum of about 2 mW.

Figure 3:
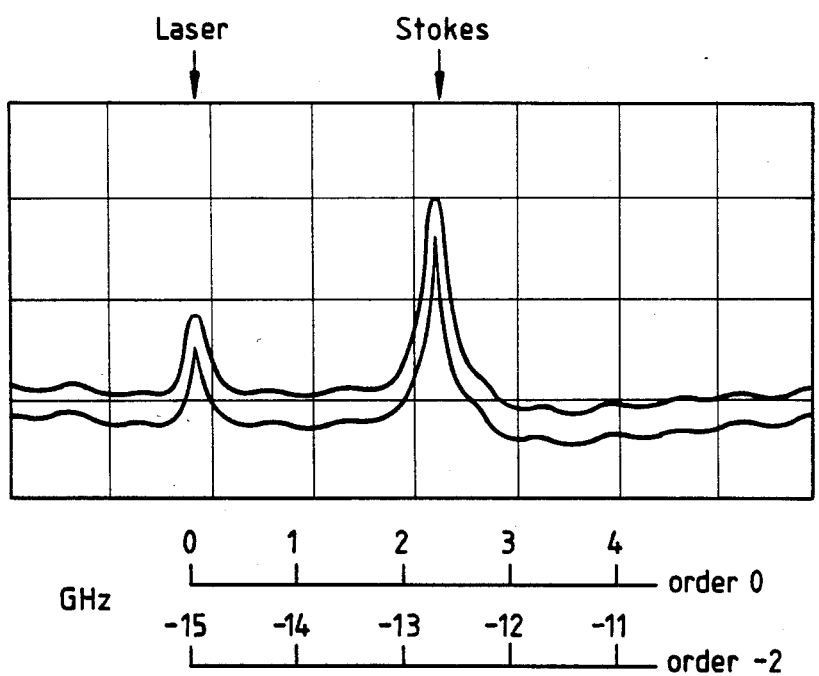
FIG. 3 is an oscilloscope trace illustrating the wavelength relationship between launched and scattered light in an optical transmission system.

FIG. 3 shows the Fabry-Perot spectrum of the backscattered light. A small amount of laser light was deliberately coupled into the interferometer to provide a calibration marker. The spectral component designated "Stokes" was present only when the power launched into the fibre exceeded the threshold value of 5 mW. If, as shown in FIG. 3, it is assumed that the laser and backscatter signals are separated by two interferometric orders (free spectral range 7.5 GHz) then the Stokes shift is 12.7±0.2 GHz. This is in good agreement with the predicted value of 13.1 GHz calculated from the expression $2V_a n/\lambda$ where the symbols are as defined below taking the value of $5.96 \times 10^3$ m s$^{-1}$ for the acoustic velocity in fused silica. The displayed linewidths are limited by the resolution of the measurement.

The frequency spectrum of light emitted from the distant end of the fibre comprised an intense component at the laser frequency and a weaker component at the Stokes frequency, the latter probably being due to reflection from the laser output mirror. Surprisingly no anti-Stokes or higher-order Stokes emissions were observed in this experiment despite the presence of feedback from the laser optics. (compare P. Labudde et al, Optics Comm., 1980, 32, 385-390).

EXPERIMENT 2

With the same apparatus as in Experiment 1, an experiment was performed on 31.6 km length of cabled single-mode fibre having a total linear loss of 17.4 dB at 1.32 μm. The experimental results were similar to those found in the 13.6 km fibre, SBS being observed with launched powers greater than 6 mW. Despite the longer physical length, the effective interaction length $L_e$ (equation 1.3 below) of 7.7 km for the 31.6 km cabled fibre is almost identical to that of the 13.6 km fibre. The other fibre parameters are similar and thus it is to be expected from equation (1.1) that the SBS threshold power will be closely similar for the two fibres.

EXPERIMENT 3

The apparatus was the same as in Experiments 1 and 2, but the laser was operated successively in each of two configurations. In the first single-frequency configuration the laser produced an output power of around 100 mW in a single longitudinal mode with a linewidth which was measured as less than 1.6 MHz, the resolution of the Fabry-Perot interferometer used for the measurement. In the second, dual-frequency configuration lasing occurred on two adjacent longitudinal modes separated by 270 MHz. In this case the laser produced an output power of about 250 mW equally divided between the two lines, and the width of each line was measured as less than 20 MHz, the instrumental resolution. In both configurations the laser output occurred in a diffraction-limited $TEM_{oo}$ transverse mode.

Figure 4:
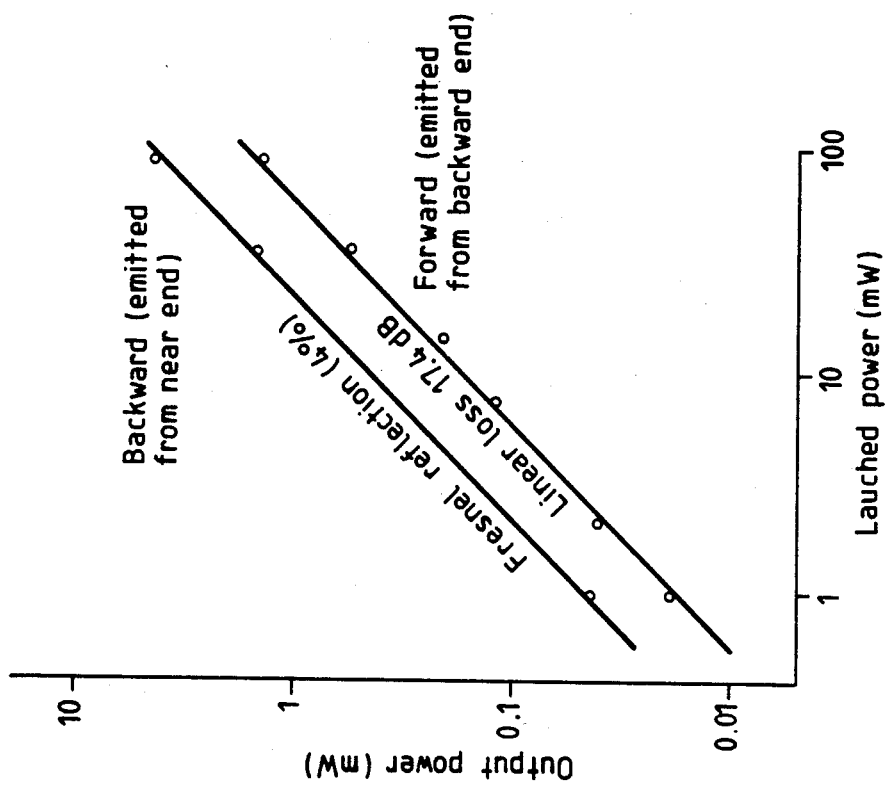
Figure 5:
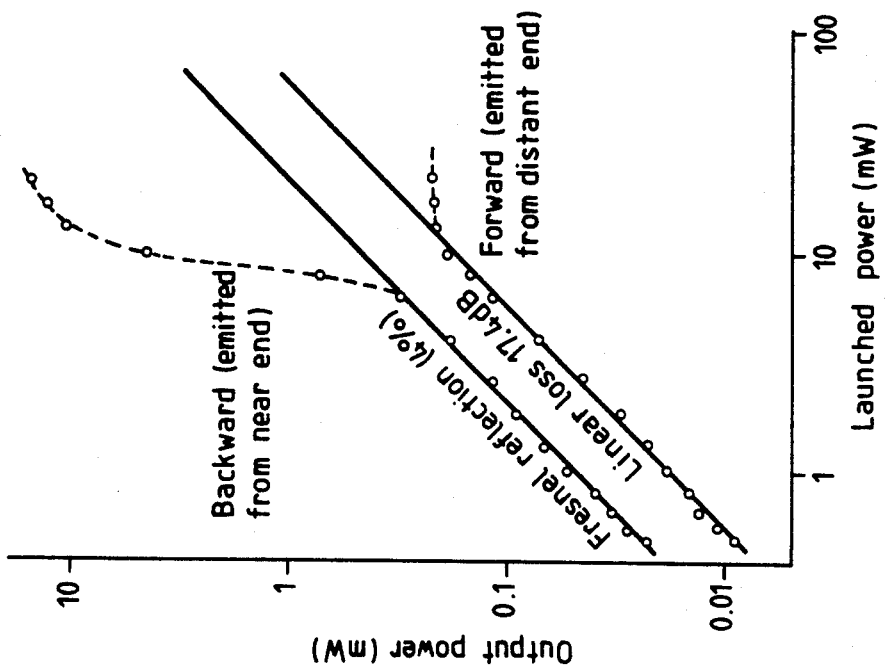

The fibre used was a 31.6 km length of cabled single-mode silica fibre having a total linear loss of 17.4 dB at 1.32 um. The theoretically predicted threshold for SBS in this fibre using the single-frequency laser is 6 mW. FIG. 4 shows the output power from each end of the fibre as a function of the launched power when the laser was operated in the single-frequency configuration. Nonlinear reflection and transmission characteristic of SBS was observed for input powers greater than 6 mW, in good agreement with theory. FIG. 5 shows the identical measurement made when the laser was operated in the dual-frequency configuration. No deviation from optical linearity in either forward or backward direction could be observed for launched powers of up to 90 mW, the maximum possible in this experiment. We have thus observed an increase of the SBS threshold power by at least 12 dB. Equation (3.2) predicts that by using the 270 MHz beat frequency SBS would occur in this fibre at input power levels greater than 850 mW, which represents a threshold increase of 21 dB.

The following discussion of a theoretical model of the operation of the invention is intended to facilitate and provide some guidance for devising and performing trial and error experiments such as described above. It will be readily understood that the theoretical model discussed below is based on some underlying simplifying assumption and is not, therefore to be taken as setting precise limits on the scope of the invention.

Starting from the small-scale steady-state theory as discussed for example by R. G. Smith, (referred to earlier) and W. Kaier and M. Maier ("Stimulated Rayleigh, Brillouin and Raman Spectroscopy", Laser Handbook Vol 2, ed. F. I. Arrecchi and E. O Schulz-Dubois, North Holland, Amsterdam 1972, pages 1077-1150), the maximum continuous wave laser power $P_L$ which can be launched into an optical fibre before SBS becomes detectable is determined by $$GL_e \approx 21 \quad (1.1)$$

where G is the SBS gain factor $$G = \frac{2\pi n^7 p_{12}^2 K}{c\lambda^2 \rho_o V_a v_B} \left(\frac{P_L}{A}\right)^{m-1} \quad (1.2)$$

and where n is the refractive index, $\rho_o$ is the material density, $V_a$ is the acoustic velocity and $P_{12}$ is the longitudinal elasto-optic coefficient of the fibre medium. "A"

is an effective cross-sectional area of the guided mode such that the peak intensity is given by $P_L/A$. An assumption here is that the laser linewidth is small compared to $\Delta\nu_B$, which is the linewidth for spontaneous Brillouin scattering (Hz, FWHM) at ambient temperature. The factor K is unity for a fibre which maintains the optical polarisation, and is ½ otherwise (compare R. H. Stolen, IEE J. Quart, Elec. 1979, QE-15, 1157-1160). The effective interaction length $L_e$ is given by $$L_e = \alpha^{-1}(1 - \exp[-\alpha L]) \quad (1.3)$$

where $\alpha$ is the absorption coefficient ($m^{-1}$) and L is the fibre length. For long fibre lengths used in communications it is usual for $L \gg \alpha^{-1}$, and hence $L_e \approx \alpha^{-1}$. Low loss fibres have longer interaction lengths and thus have lower SBS thresholds.

We have inserted in these equations the following bulk parameters for fused silica (compare R. J. Pressley (ed), "Handbook of Lasers" Chemical Rubber Company, Cleveland, 1971 and J. Schroeder et al, J Amer, Ceram. Soc., 1973, 56, 510-514): $n = 1.451$, $\rho_o = 2.21 \times 10^3$ kg m$^{-3}$, $V_a = 5.96 \times 10^3$ m s$^{-1}$,
$p_{12} = 0.286$.

Since the spontaneous linewidth $\Delta\nu_B$ is 38.4 MHz at the wavelength $\lambda = 1.0$ μm and varies as $\lambda^{-2}$ (compare D Heinman et al, Phys. Rev., 1979, B19, 6583-6592) we suggest that $\Delta\nu_B = 22$ MHz at 1.32 μm. Further we have inserted the following values appropriate to a particular 13.6 km test fibre: $\alpha = 9.5 \times 10^{-5}$ m$^{-1}$ (0.41 dB/km loss), $L_e = 7.6$ km, $A = 4.7 \times 10^{-11}$ m$^2$ and $K = ½$. Thus one may predict the threshold for SBS in this test fibre at 1.32 um to be $P_L \approx 5.6$ mW. Experiment 1 above relates to this test fibre.

In order to analyse a transient scattering process we have use the coupled equations for the slowly-varying complex Fourier amplitudes of the optical electric fields E and density wave $\rho$ on the core axis.

$$\frac{\partial E_s}{\partial z} = -iK_2\rho^* E_L + \alpha E_s/2 \quad (2.1)$$

$$\frac{\partial \rho^*}{\partial \tau} = -iK_1 E_L^* E_s - \Gamma \rho^* \quad (2.2)$$

(These equations may be compared with equations quoted in R. L. Carman, F. Shimizu, C. S. Wang, and N. Bloembergen, 'Theory of Stokes pulse shapes in transient stimulated Raman scattering', Phys Rev A, 1970, 2, 60-72.) The laser field (subscript L) is launched into the fibre at $z = 0$ and travels in the $=z$ direction. The Stokes field (subscript S) travelling in the $-z$ direction builds up from spontaneous scattering; this can be represented by a Stokes field injected at a position $z = z_o$ where $z_o \approx 3\alpha^{-1}$ and $\alpha$ is the optical absorption coefficient (compare R. G. Smith, already cited). The travelling coordinate $\tau = t \pm z/v$ where the negative (positive) sign refers to the laser (Stokes) field and v is the optical group velocity (assumed much greater than the acoustic group velocity). $\Gamma^{-1}$ is the acoustic phonon lifetime. the Spontaneous Brillouin Scattering linewidth (Hz, FWHM) is $\Gamma/\pi$. The coupling coefficients are $$K_1 = K_2 \frac{\rho_o n^2 G_o}{2V_a}$$

$$K_2 = \frac{\pi n^3 p_{12}}{\lambda \rho_o}$$

where $n = \beta\lambda/2\pi$, $\beta =$ optical propagation constant, $p_{12} =$ longitudinal elasto-optic coefficient, $\lambda =$ optical wavelength, $\rho_o =$ average density, $V_a =$ acoustic velocity, $\epsilon_o =$ free space permittivity (SI units).

It can be argued (compare R. G. Smith, already cited) that detectable SBS will occur only for launched laser powers exceeding the critical value for which the following inequality holds:

$$\ln|E_s(0,\tau)/E_S(z_o,\tau)|^2 \geq 18 \quad (2.3)$$

For launched powers not exceeding this critical level, depletion of the laser field due to SBS would be negligible, and presumably also that due to other competing non-linear processes.

We suggest that, essentially, the laser field in the fibre is determined only by the launched field and linear absorption, $$E_L(z,\tau) = E_L(0,\tau) \exp(-\alpha z/2) \quad (2.4)$$

Equations (2.1) and (2.2) above (compare Carman et al, already cited and K Daree "Transient effects in stimulated light scattering", Opt Quant Electr, 1975, 7, pp 263-279) may be solved by Riemann's method to obtain an expression for Stokes field $E_s(z,\tau)$ which emerges at $z = 0$, $$E_s(0,\tau) = (\kappa_1\kappa_2 z_e)^{\frac{1}{2}} \exp(-\alpha z/2) E_L(0,\tau) \times \quad (2.5)$$

$$\int_{-\infty}^{\tau} \exp[-\Gamma(\tau-\tau')]E_L^*(O,\tau')E_s(z,\tau')[W-W']^{-\frac{1}{2}} \times$$

$$I_1[\{(4\kappa_1 I_1\{((4_1\kappa_2 z_e(W-W'))^{\frac{1}{2}}\}]d\tau'$$

where $z_e = [1 - \exp(-\alpha z)]/\alpha$ $$W(\tau) = \int_{-\infty}^{\tau} |E_L(O,\tau'')|^2 d\tau''.$$

W' denotes W($\tau'$), and $I_1$ is a modified Bessel function. Equation (2.5) can be used to ascertain whether the threshold condition (2.3) is exceeded for any arbitrary input field.

We shall now evaluate (2.5) for particular cases relevant in optical communications, namely those in which the laser field is modulated to transmit a binary data stream represented by the function m(t) which can take values 0 and 1. Two major simplifications will be made. Firstly, it is assumed that the time-average of the modulation function m(t)

$$\Delta t \int^{1/t} -\Delta t m(t) dt \rightarrow m$$

which converges for sufficiently large $\Delta t$, does so for $\Delta t < \Gamma^{-1}$. Since $\Gamma/\pi = 22$ MHz in fused silica at room temperature and at 1.32 μm (see R G Smith, already cited) and since $\Gamma$ scales as $\lambda^{-2}$, we believe that the above assumption is valid for optical transmission using most low-disparity line codes at bit rates of a hundred Mbit/s or higher. (Notice that even for a balanced code, m may differ from ½ if return-to-zero or other special technique is used.) The second assumption is that $\alpha^{-1} \gg v\Gamma^{-1}$. We observe that this is likely to be the case for low-loss silica fibres since, for example, $\alpha^{-1} \simeq 8.7$ km at 1.3 μm (for 0.5 dB/km loss) and $v\Gamma^{-1} \simeq 3.5$ m. These simplifications allow exact analytical solutions of the integral equation (2.5) to be obtained in terms of $\overline{m}$.

In order to consider different modulation techniques in the form of amplitude-, phase, and frequency-shift keying, we start by separating amplitude and phase fluctuations of the input field, $$E_L(O,t) = E_{LO} a(t) \exp[i\phi(t)] \quad (2.6)$$

where $E_L$ is constant, and $a$ and $\phi$ are real and continuous functions. Equation (2.5) is solved to find the gain factor G, where $$\ln|E_s(O,\tau)/E_s(z,\tau)|^2 = Gz_e - \alpha z \quad (2.7)$$

The SBS threshold can be evaluated in each case and, since $z_o \simeq 3\alpha^{-1}$, the threshold criterion (2.3) becomes $$G\alpha^{-1} \leq 21 \quad (2.8)$$

In the case where there is no modulation, we suggest that $$G = G_{ss} = \frac{2\kappa_1\kappa_2 |E_{LO}|^2}{\Gamma} = \frac{4\kappa_1\kappa_2}{n\epsilon_o c\Gamma}\left(\frac{P_L}{A}\right) \quad (2.9)$$

where $P_L$ is the laser power launched into the fibre and A is the effective area of the guide mode. This is consistent with equations (2.1) and (2.2) for $(\partial \rho^*/\partial \tau) \to 0$.

In the case where there is amplitude modulation according to $$a(t) = 1 - [1 - m(t)][1 - (1 - k_a)^{\frac{1}{2}}] \quad (2.10)$$

where $k_a$ is the depth of intensity modulation $(0 < k_a \leq 100\%)$, we suggest that $$G = [\overline{m} + (1 - \overline{m})(1 - k_a)^{\frac{1}{2}}]^2 G_{ss} \quad (2.11)$$

where $G_{ss}$ is given by (2.9) and in this case $P_L$ represents the peak power launched into the fibre. (The average power is $[\overline{m} + (1 - \overline{m})(1 - k_a)]P_L$.) According to (2.11) G is minimised for $k_a = 100\%$. In that case $G = G_{ss} \overline{m}^2$ and $\overline{m}$ is the laser duty factor (typically 0.5).

In the case where there is phase modulation according to $$a(t) = 1 \quad (2.12)$$
$$\phi(t) = k_p[m(t) - \overline{m}]$$

where $k_p$ is the keyed phase shift, we suggest that $$G = [1 - 2\overline{m}(1 - \overline{m})(1 - \cos k_p)]G_{ss} \quad (2.13)$$

and that for particular values of the phase shift $k_p$, G approaches zero. If for example $\overline{m} = \frac{1}{2}$, then G is zero for $k_p = (2n+1)\pi$; $n = 0, 1, 2 \ldots$ We propose that for this value of $\overline{m}$ and for these values of $k_p$, SBS may be suppressed so as to allow higher powers to be launched into the fibre.

We now consider the case where frequency modulation is used according to $$a(t) = 1 \quad (2.14)$$

-continued
$$\phi(t) = k_f \int_{-\infty}^{t} [m(t) - \overline{m}]dt$$

where $k_f/2\pi$ is the keyed frequency shift (Hz), which for practical purposes should be at least as large as the bit rate. Here we have deliberately selected the Fourier frequency for which the time-averaged value of $\phi(t)$ is zero, since the corresponding Stokes frequency is the one which experiences the maximum SBS gain. In equation (2.14), unlike the equations for amplitude- and phase-shift keying, the modulated parameter depends on the past history of the data stream and on the coding statistics. If $p(\Psi)d\Psi$ represents the probability that at any particular time the phase angle $\phi(t)$ lies in the range $\Psi, \Psi + d\Psi (-\pi < \Psi \leq \pi)$, evaluated using (2.14), we suggest (having regard to equation (2.5)) that $$G = PP^*G_{ss} \quad (2.15)$$

where $$P = \int_{-\pi}^{\pi} (\psi)\exp(i\psi)d\psi \quad (2.16)$$

If, for example, m(t) is a unit square wave of period 2/B representing the data sequence 010101 ... where B is the bit rate and $\overline{m} = \frac{1}{2}$, we suggest that $P = \text{sinc}(k_f/2B)$. We suggest that generally, as in this example, $G \to G_{ss}$ as $k_f \to 0$, and that $G \to 0$ for $k_f/2B \gg 1$. We propose the suppression of SBS by using a sufficiently large frequency shift $k_f$, and suggest that SBS gain will generally be lower when using a high-disparity code compared with a balanced code for which the phase excursions (14) are within narrower bounds.

In more qualitative terms, we suggest that for significant SBS to occur, the optical field must be capable of building up (by electrostriction) a strong coherent acoustic wave within the decay time $\Gamma^{-1}$. In the case of amplitude keying, we believe that the optical pulses are additive in their effect of generating a coherent acoustic wave. However in phase-shift keying, provided the appropriate phase shift is chosen, we suggest that the net acoustic excitation produced by the optical field may be made zero by ensuring that the acoustic excitation produced by the field in the time periods representing the binary digit zero is counteracted by the phase-shifted field in the periods representing the digit one (in the case where $\overline{m} = \frac{1}{2}$, the optical fields in the periods representing zeros and ones are in exact anti-phase). Similarly in frequency-shift keying, provided the frequency shift is sufficiently large, we suggest that the continual phase changes of the optical field will result in only a small net acoustic excitation and that thus SBS is suppressed.

We accordingly propose, despite the very low thresholds for SBS which have recently been observed in low-loss silica fibres using continuous-wave lasers, that coherent optical transmission systems be designed to use modulation techniques which will eliminate any practical limitation on power levels and repeater spacing due to SBS. While for amplitude shift keying systems the SBS threshold differs by only a small numerical factor from the continuous wave case, selection of appropriate operating parameters in phase and frequency shift keying systems can suppress SBS to the extent that no longer presents a major limitation.

We now consider the case where a laser field is launched into the fibre consisting of two optical frequencies separated by $\Delta\nu_m$ and having equal amplitudes $\frac{1}{2}E_o$. The spectral width of each line is assumed to be small compared to $\Delta\nu_{B'}$, which is the Spontaneous Brillouin Scattering linewidth (FWHM) at ambient temperature. Thus the Fourier amplitude of the total launched laser field as a function of time t is $$E_L(t) = E_o \cos(\pi\Delta\nu_m t + \theta) \qquad (3.1)$$

where $\theta$ is a constant. If this is inserted into the earlier coupled wave equations for the electric field and density wave in the fibre, the result is an expression for the SBS gain coefficient $$G = \frac{G_{ss}\Delta\nu_B{}^2}{2[\Delta\nu_B{}^2 + \Delta\nu_m{}^2]} \qquad (3.2)$$

where $G_{ss}$ is the gain coefficient for SBS which would be produced by a single-frequency laser of field amplitude $E_o$. An assumption in this calculation is $\Delta\nu_m >> \alpha V$ where V is the optical group velocity, and $\alpha$ is the power absorption coefficient. Note also that $\alpha^{-1}$ is effective interaction length for SBS. We suggest that when the beat frequency $\Delta\nu_m$ is much greater than $\Delta\nu_B$, the gain G is reduced. Since the SBS threshold is inversely proportional to G (compare above and also R G Smith already quoted), the threshold is correspondingly increased. We suggest that this is because according to the Fourier amplitude of the laser field in the fibre undergoes phase changes of $\pi$ at a rate equal to the beat frequency. For significant SBS to occur, the laser field must be capable of building up (by electrostriction) a strong coherent acoustic wave within the dephasing time $\Delta\nu_B{}^{-1}$. But if the optical phase reversals occur more frequently than the spontaneous acoustic dephasing, then the acoustic wave is unable to build up to a large amplitude and thus the SBS gain is smaller. (The apparent factor of 2 decrepancy between $G_{ss}$ and G in the limit $\Delta\nu_m << \Delta\nu_B$ in equ. (2) arises from our assumption that $\Delta\nu_m >> \alpha V$).

The spontaneous Brillouin linewidth in silica fibre is 38.4 MHz at the wavelength $\lambda=1.0$ $\mu$m and varies as $\lambda^{-2}$ (see D. Heinman et al, 'Brillouin scattering measurements on optical glasses', Phys. Rev., 1979, B19, pp 6583-6592); therefore the values at $\lambda=1.3$ and 1.55 $\mu$m are 23 and 16 MHz respectively. We therefore suggest beat frequencies $\Delta\nu_m$ at least several tens of megahertz will generally be necessary to achieve practically interesting suppression of SBS. For fibres having losses of 1 dB/km or less, $\alpha$ is less than $2\times10^{-4}$ m$^{-1}$ and so the earlier assumption that $\Delta\nu_m >> \alpha V$ is amply justified.

The suppression of SBS is expected to become, however, less effective for very high $\Delta\nu_m$. In this respect we note that the difference between the phonon frequencies corresponding to the two laser frequencies should be much smaller than $\alpha\nu_B$ to ensure complete wave coupling, and so $$\frac{2V_a \Delta\nu_m}{C}(n - \lambda dn/d\lambda) << \Delta\nu_B \qquad (3.3)$$

where $V_a$ is the acoustic velocity and $\lambda$ is the optical wavelength. Inserting typical values for silica fibre (n=1.5, $V_a=6\times10^3$ m.s$^{-1}$, $\Delta\nu_B=16$ MHz, $\lambda dn/d\lambda=0.02$) we require $\Delta\nu_m << 270$ Ghz which is satisfied for $\Delta\nu_m$ not exceeding a few tens of gigahertz.

In principle, there is another factor which may lead to less effective suppression of SBS for very high $\Delta\nu_m$. So long as the difference in group delays for the two frequencies is small compared with the minimum pulse duration, pulse overlap for the two frequencies (and hence mode beating) is expected to occur throughout the length of the fibre; but for very high $\Delta\nu_m$ this might in principle no longer obtain because of dispersion. However, this appears not to be of great practical importance, as is illustrated by the case of a 300 km length of silica fibre operated at a wevelength of 1.55 $\mu$m for which the group velocity dispersion is 20 ps/nm/km. If the beat frequency $\Delta\nu_m$ is 1 GHz, then the calculated difference in group delay for the two frequencies is only 50 ps.

We suggest that even for a long fibre of the type specified in Example 4 above the SBS threshold for $\Delta\nu_m=1$ GHz would be in excess of 15 W typically.

Implicit in our above analysis is the assumption that the unmodulated laser linewidth is small compared to $\Gamma$; this encompasses the range of interest for coherent optical transmisson. For SBS generated by inhomogenously-broadened sources a statistical treatment of stimulated light scattering would, we suggest, be required.

The following calculated Examples illustrate the theoretical model of the present invention.

EXAMPLE 1

Figure 6A:
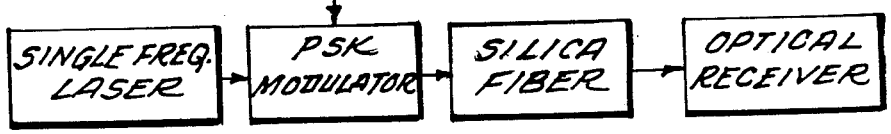
FIGS. 6a, 6b and 6c illustrate Examples 1–4 demonstrating the invention.

(illustrated in FIG. 6a)

A silica fibre has the following properties (all figures are approximate):

Optical absorption coefficient, $\alpha$, at 1.3 um=$(1.1\times10^4)^{-1}$ m$^{-1}$, where $\alpha$ is defined as $1/z \ln(P_0/P_z)$ where $P_0$ and $P_z$ are light powers at distances 0 and z along the fibre in the direction of transmission in the absence of non-linear effects.

| | |
|---|---|
| Density, $\rho_0$ | = $2.21 \times 10^3$ kg m$^{-3}$ |
| Speed of sound in the core, $V_a$ | = $6.0 \times 10^3$ m sec$^{-1}$ m sec$^{-1}$ |
| Refractive index of the core, | = 1.47 |
| Mode guidance area for 1.3 $\mu$m radiation, A | = $1.4 \times 10^{-11}$ m$^2$, | where A=$P/I_{max}$, $I_{max}$ being the maximum light intensity at the centre of the core for a light power P in the absence of nonlinear effects.

Longitudinal elasto-optic coefficient, $p_{12}=0.27$, where $P_{12}$ is as defined in J Saprial, "Acousto-Optics", Chapter V, Wiley (1979).

Stimulated Brillouin Scattering linewidth at 1.3 $\mu$m, $\Gamma=7.1\times10^7$ rad s$^{-1}$, where $\Gamma$ is the constant in equation (2.2) hereinafter. ($\Gamma$ governs the rate at which a density wave decays in the absence of external stimulation ($E_L=0$ in equation (2)) according to $(\partial\rho/\partial\tau)=-\Gamma\delta^*$. This is discussed in detail in, for example, W. Kaiser and M Maier, "Stimulated Rayleigh, Brillouin and Raman Spectroscopy", Laser Handbook Volume 2, ed. F I Arrecchi and E O Schulz-Dubois (North-Holland, Amsterdam, 1972) pages 1077-1150.)

Into 30 km of this fibre, phase-shift-keyed light signals (wavelength 1.3 um) are launched. The linewidth of the unmodulated light source is less than 1 MHz, and the power launched into the fibre is 100 mW. Transmission of a binary data stream represented by a modulation function m(t) which can take values 0 and 1 is effected in such manner that the average $\bar{m}$ of the modulation function is close to ½ even over times shorter than $\Gamma^{-1}$. The bit rate of the transmission is 1 GBit s$^{-1}$ and a keyed phase $k_p$ of 180° is used. Negligible Stimulated Brillouin Scattering is observed.

EXAMPLE 2

Figure 6B:
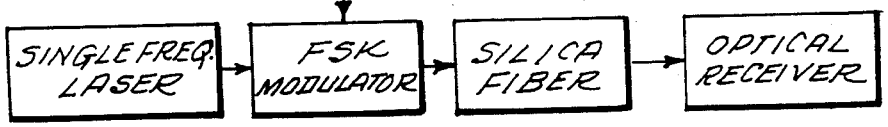

(illustrated in FIG. 6b)

In this example, the light source power and linewidth and also the fibre characteristics and length are as in Example 1, but the binary data stream is transmitted by frequency shift keying in such manner that $\bar{m}$ is again close to ½ even over times shorter than $\Gamma^{-1}$. The bit rate of the transmission is 140 MBit s$^{-1}$ and a keyed frequency shift $k_f$ of 8 GHz is used. Negligible Stimulated Brillouin Scattering is observed.

EXAMPLE 3

(illustrated in FIG. 6b)

Example 2 is repeated, with a bit rate of 1 GBit s$^{-1}$ and a keyed frequency shift of 35 GHz. Again, negligible Stimulated Brillouin Scattering is observed.

EXAMPLE 4

Figure 6C:
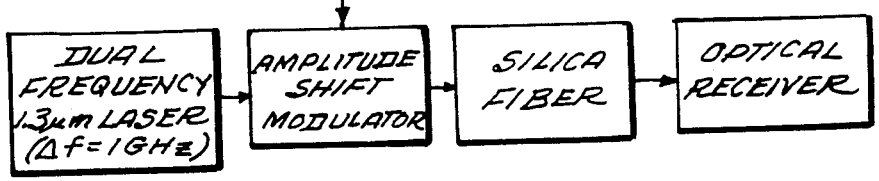

(illustrated in FIG. 6c)

In this Example, the silica fibre used has a cabled and jointed loss in the absence of non-linear effects of 0.3 dB/km at 1.3 um, and the characteristics of the fibre other than α are as in Example 1. An optical carrier wave is launched into the fibre modulated in accordance with an amplitude shift keying scheme at 140 MBit s$^{-1}$. When the wave is "on" the power is 1 W split between two frequencies differing by 1 GHz and having a linewidth of less than 1 MHz. $\bar{m}$ is ½. Both frequencies correspond to a wavelength close to 1.3 μm. No Stimulated Brillouin Scattering is observed.

It is envisaged that, with a receiver sensitivity of—60 dBm (suitable for a 10$^{-9}$ error rate—see Y Yamamoto, "Receiver Performance evaluation of various digital optical modulation-demodulation systems in the 0.5-10 um wavelength region", IEEE J. Quant. Elec., 1980, QE-16, pp. 1251-1259), that this would allow data transmission over distances of approximately 300 km *without repeaters*.

What I claim is:

1. A method of transmitting coherent light along an optical fibre in an optical communication system at power levels which exceed the normally expected Stimulated Brillouin Scattering (SBS) threshold which method comprises:
    launching into the fibre a coherent optical wave having a power level in excess of the normally expected Stimulated Brillouin Scattering threshold and a phase angle which is varied with respect to time in such a manner that Stimulated Brillouin Scattering is substantially suppressed and the power level of the successfully propagated component of the optical wave is increased.

2. A method of optically transmitting information along light conducting fibres having increased length between required repeater amplifying stations, which method comprises:
    launching into an optical fibre at least one coherent optical wave having a power level in excess of the normally expected Stimulated Brillouin Scattering threshold and having effected phase reversals which occur more frequently than the spontaneous acoustic dephasing time $\Delta\nu_B^{-1} = \pi\Gamma^{-1}$ (where $\Gamma^{-1}$ = the acoustic phonon lifetime) so as to substantially suppress stimulated Brillouin Scattering, and
    modulating at least one component of said optical wave in correspondence with the information to be transmitted.

3. A method of optically transmitting information as in claim 2 wherein binary-valued digital information is binary phase-shift-keyed onto said optical wave in correspondence with the information to be transmitted, the magnitude of each keyed phase shift being $(2n+1)\pi$, n being zero or an integer.

4. A method of optically transmitting information as in claim 2 wherein binary-valued digital information is frequency-shift-keyed onto said optical wave in correspondence with said information, the magnitude of the keyed frequency shift being sufficiently great that Stimulated Brillouin Scattering is substantially suppressed.

5. A method according to claim 4, wherein the frequency shift keying is binary frequency shift keying.

6. A method according to claim 3, 4 or 5, wherein the bit rate is at least 100 MBit s$^{-1}$.

7. A method according to claim 2 wherein said launching step comprises producing and combining coherent optical waves of differing frequencies by the addition of which the variation of phase angle is achieved.

8. A method according to claim 7, wherein the waves of differing frequencies originate simultaneously in a single source.

9. A method according to claim 8 wherein said source is a laser and the waves are different longitudinal modes of the laser.

10. A method according to claim 8 or 9 wherein the modulation in correspondence with the information to be transmitted is effected by control of the said source.

11. A method according to claim 7, 8 or 9 wherein the modulation in accordance with the information to be transmitted is an amplitude modulation.

12. A method of transmitting coherent light along an optical fibre, wherein the light linewidth determines a natural Stimulated Brillouin Scattering threshold power level for the fibre, the method comprising:
    generating coherent light having a predetermined linewidth in light generating means,
    introducing recurrent phase deviations in said coherent light, and
    launching said light into an optical fibre at a power level which is above the natural Stimulated Brillouin Scattering threshold power level for the fibre at said predetermined linewidth, wherein the recurrent phase deviations substantially suppress Stimulated Brillouin Scattering.

13. A method according to claim 12, wherein said generating, introducing and launching steps comprise:
    generating coherent light at a plurality of distinct wavelengths, and
    launching a composite light wave comprising said distinct plurality of wavelengths into said fibre, thereby to introduce said recurrent phase deviations as a result of superposition of light of said distinct wavelengths.

14. A method according to claim 13, further comprising:

generating said coherent light at a plurality of distinct wavelengths in light generating means comprising a single laser source, and transmitting information by applying to the light of at least one of said distinct wavelengths a modulation in correspondence with information to be transmitted.

15. A method according to claim 13, further comprising:

generating said coherent light at a plurality of distinct wavelengths in light generating means comprising a plurality of sources, and transmitting information by applying to the light of at least one of said distinct wavelengths a modulation in correspondence with the information to be transmitted.

16. A method according to claim 14 or 15 wherein the modulation is amplitude modulation.

17. A method according to claim 14 or 15, comprising generating the coherent light of each distinct wavelength from a separate longitudinal mode of a laser light source.

18. A method according to claim 12, further comprising:

transmitting information by applying to the light a modulation in correspondence with the information to be transmitted, wherein said modulation introduces said recurrent phase deviations.

19. A method according to claim 18, wherein the information is binary-valued digital information, and the modulation is binary phase shift keying, the recurrent phase deviations being keyed phase shifts of substantially $(2n+1)\pi$, (n being zero or an integer).

20. A method according to claim 18, wherein the information is binary-valued digital information, and the modulation is frequency shift keying, the recurrent phase deviations being introduced by keyed frequency shifts.

21. A method according to claim 20, wherein the frequency shift keying is binary-valued frequency shift keying.

22. A method according to claim 19, 20 or 21 wherein the information is transmitted at a bit rate of at least 100 MBit/s.

23. A method according to claim 12 wherein said generating, introduced and launching steps comprise:

generating coherent light at a plurality of distinct wavelengths, introducing said recurrent phase deviations into the light of at least one of said distinct wavelengths, and transmitting information by applying to the light of at least one other of said distinct wavelengths a modulation in correspondence with the information to be transmitted.

24. A method of transmitting and receiving information along an optical fibre comprising:

transmitting information by launching coherent light of at least one wavelength into one end of an optical fibre, which launched light is modulated in correspondence with the information to be transmitted by a method according to claim 36, 37, 40 or 45, coherently detecting the transmitted light emerging from the other end of the fibre, and demodulating said detected light to recover said information.

25. A method according to claim 14, 15, 18 or 23 wherein the modulation in correspondence with the information to be transmitted is effected by control of the light generating means.

26. An optical transmission system comprising: an optical fibre having a natural stimulated Brillouin scattering power threshold for a given linewidth light, light generating means to generate light of predetermined linewidth and at a power above the natural Stimulated Brillouin Scattering power threshold for the fibre at that linewidth, means to launch said generated light into the fibre at said excess power level, and means for introducing recurrent phase deviations in the transmitted light at a rate which is sufficiently high to substantially suppress Stimulated Brillouin Scattering.

27. An optical transmission system according to claim 26, for transmitting information, wherein the means for introducing recurrent phase deviations comprises modulating means for modulating the light in correspondence with information to be transmitted.

28. An optical transmission system according to claim 27, for transmitting binary-valued digital information, wherein said modulating means includes binary phase shift keying means for effecting recurrent phase deviations of substantially $(2n+1)\pi$, (n being zero or an integer).

29. An optical transmission system according to claim 27, for transmitting binary-valued digital information, wherein said modulating means includes frequency shift keying means for effecting said recurrent phase deviations by introducing keyed frequency shifts in said transmitted light.

30. An optical transmission system according to claim 26, wherein said light generating means generates plural light waves at a corresponding plurality of distinct wavelengths and said recurrent phase deviations are introduced by superposition of said plural light waves.

31. An optical transmission system according to claim 30, wherein the light generating means comprises a single optical source to generate light waves at a plurality of distinct wavelengths.

32. An optical transmission system according to claim 30, wherein the light generating means comprises a plurality of optical sources.

33. An optical transmission system according to claim 31 or 32 wherein the distinct wavelengths are separate longitudinal modes of a laser light source.

34. An optical transmission system according to claim 30, for transmitting information, further comprising modulating means for applying to the light of at least one of said plurality of distinct wavelengths an amplitude modulation in correspondence with the information to be transmitted.

35. An optical transmission system according to claim 27 or 34 wherein the modulating means controls the light generating means.

36. An optical communication system comprising:

a transmission system according to claim 26, 27 or 30 and further comprising means to coherently detect and receive light emerging from the fibre.

37. An optical system according to claims 26, 27 or 30 wherein said optical fibre is a silica fibre having a loss not exceeding 0.5 dB/km at the wavelength of operation, and having a length of at least 10 km.

* * * * *

REEXAMINATION CERTIFICATE (3532nd)

United States Patent [19]

Cotter

[11] B1 4,560,246

[45] Certificate Issued Jun. 9, 1998

[54] OPTICAL TRANSMISSION

[75] Inventor: David Cotter, Woodbridge, England

[73] Assignee: British Telecommunications Public Limited Company, United Kingdom

Reexamination Request:
No. 90/004,728, Aug. 20, 1997

Reexamination Certificate for:
Patent No.: 4,560,246
Issued: Dec. 24, 1985
Appl. No.: 500,436
Filed: Jun. 2, 1983

[30] Foreign Application Priority Data

Jun. 4, 1982 [GB] United Kingdom ............... 8216307

[51] Int. Cl.$^6$ ............... G02B 6/26; G02B 6/42; G02B 6/28
[52] U.S. Cl. ............... 385/27; 385/24; 359/156
[58] Field of Search ............... 385/24, 27; 359/156, 359/181, 182

[56] References Cited

PUBLICATIONS

DeLange, "Wide-Band Optical Communication Systems: Part II—Frequency-Division Multiplexing", Proceedings of the IEEE, Oct., 1970, pp. 1683–1690.

Yamamoto et al, "Coherent Optical Fiber Transmission Systems", IEEE Journal of Quantum Electronics, vol. QE-17, No. 6, Jun. 1981, pp. 919–934.

D. Cotter, "Observation of Stimulated Brillouin Scattering in Low–Loss Silica Fibre at 1.3 μm", Electronics Letters, $10^{th}$ Jun. 1982, vol. 18, No. 12, pp. 495–496.

"Transient Stimulated Brillouin Scattering in Long Single–Mode Fibres", Electronics Letters, $10^{th}$ Jun. 1982, vol. 18, No. 12, pp. 504–506.

"Suppression of Stimulated Brillouin Scattering During Transmission of High–Power Narrowband Laser Light in Monomode Fibre", Electronics Letters, $22^{nd}$ Jul. 1982, vol. 18, No. 15, pp. 638–640.

David Cotter, "Stimulated Brillouin Scattering in Coherent Optical Transmission Systems", $8^{th}$ European Conference on Optical Communication Cannes, France, 21–24 Sep. 1982.

*Primary Examiner*—Akm E. Ullah

[57] ABSTRACT

Stimulated Brillouin Scattering, which occurs when light of narrow linewidth and above a threshold power is launched into a low loss optical fiber, is suppressed by time-varying the phase angle of the transmitted light waves.

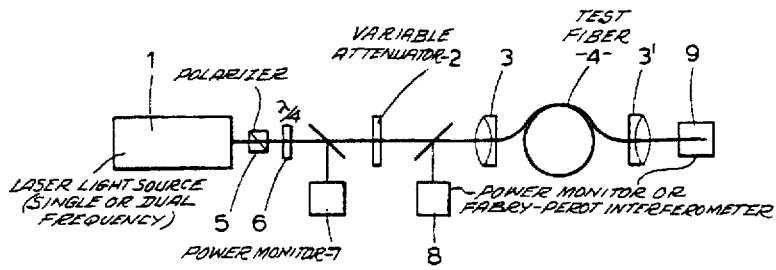

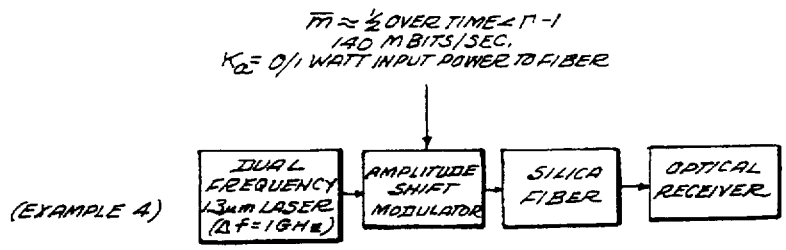

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 26–31:

The time variation of phase angle required for substantial suppression of Stimulated Brillouin Scattering is also readily determined by trial and error experiment. The manner in which such experiments can be designed [with] *will* become apparent directly from and also by analogy with the more specific discussion hereinafter.

Column 5, line 61–column 6, line 4:

Another way of using a wave which has been modulated with a periodically-driven phase modulator or which is the resultant of the addition of component waves of different frequencies is [as] *an* optical phase reference to be used in the demodulation of a separate wave which has phase or frequency information modulation. Thus in some phase or frequency shift keyed systems it may be necessary to transmit simultaneously a continuous wave carrier component in order to provide an optical phase reference, and the present invention finds application insofar as the carrier component could give rise to SBS in some circumstances.

Column 6, lines 5–9:

A wave modulated with a periodically-driven phase modulator or which is the resultant [in] *of* the addition of component waves of different frequencies may, of course, be used for continuous wave transmission generally and not only in telecommunications.

THE DRAWING FIGURES HAVE BEEN CHANGED AS FOLLOWS:

FIG. 6(c) the less than symbol "<" should be inserted after "TIME".

AS A RESULT OF REEXAMINATION, IT HAS BEEN DETERMINED THAT:

The patentability of claims 1, 12–23 and 25–37 are confirmed.

Claims 2 and 24 are determined to be patentable as amended.

Claims 3–11, dependent on an amended claim, are determined to be patentable.

2. A method of optically transmitting information along light conducting fibres having increased length between required repeater amplifying stations, which method comprises:

launching into an optical fibre at least one coherent optical wave having a power level in excess of the normally expected Stimulated Brillouin Scattering threshold and having effected phase reversals which occur more [frequenly] *frequently* than the spontaneous acoustic dephasing time $\Delta v_B^{-1} = \pi \Gamma^{-1}$ (where $\Gamma^{-1}$=the acoustic phonon lifetime) so as to substantially suppress stimulated Brillouin Scattering, and modulating at least one component of said optical wave in correspondence with the information to be transmitted.

24. A method of transmitting and receiving information along an optical fibre comprising:

transmitting information by launching coherent light of at least one wavelength into one end of an optical fibre, which launched light is modulated in correspondence with the information to be transmitted by a method according to claim [36, 37, 40 or 45] *14, 15, 18 or 23*, coherently detecting the transmitted light emerging from the other end of the fibre, and demodulating said detected light to recover said information.

* * * * *